Nov. 29, 1960     J. BOCHAN     2,962,046
FLOW CONTROL DEVICE
Filed Sept. 5, 1958

INVENTOR.
JOHN BOCHAN
BY   *Derek P Lawrence*
HIS ATTORNEY

United States Patent Office

2,962,046
Patented Nov. 29, 1960

---

2,962,046

FLOW CONTROL DEVICE

John Bochan, Louisville, Ky., assignor to General Electric Company, a corporation of New York Filed Sept. 5, 1958, Ser. No. 759,237

5 Claims. (Cl. 137—513.5)

My invention relates to devices for controlling flow through a pipe or other conduit, and more particularly to such devices for maintaining a relatively constant flow over a wide range of inlet pressures.

Flow control devices for regulating the flow through a conduit so as to produce a relatively constant output flow regardless of the inlet pressure are used in various types of apparatus. By way of example, these devices, hereinafter referred to simply as flow control devices, are used in drinking fountains, in water heating apparatus, and in lavatory and shower bath equipment. Further, they have found wide use in automatic washing machines for controlling the rate of filling of the water containing tub, and in automatic drying machines of the type which use cold water for condensing moisture from the air after it has been passed in contact with the clothes to be dried and before it is either resued or exhausted to atmosphere.

It is a general object of my invention to provide a new and improved flow control device which is extremely simple in construction and operation, yet is effective to maintain a relatively constant flow over a wide range of inlet pressure.

A more specific object of my invention is to provide such a control device particularly suited to the control of relatively low rates of flow, such as, for instance, on the order of one half gallon per minute. Flow rates of this type are provided in connection with such functions as the provision of water for condensing purposes in automatic drying machines.

In carrying out my invention, I provide a flow control device which has a passageway through which the flow to be controlled is passed. The passageway is closed at its outlet by a rigid wall or plate which has a single aperture formed therein in a plane substantially normal to the flow axis of the passageway. Upstream of the aperture, I provide a single sphere formed of resilient compressible material, so that upon flow the sphere will seat in the aperture. To effect the flow controlling function, the aperture is formed as a series of at least two substantially triangular sections of different dimensions abutting about a generally circular center section. Upon flow, the sphere is flattened out against the aperture; as the pressure increases the sphere blocks off the triangular sections progressively with increasing inlet pressure, closing them off one by one as the pressure rises. This results in a relatively constant flow through the device regardless of increases or decreases in the pressure.

The subject matter which I regard as my invention is particularly pointed out and distinctly claimed in the concluding portion of the specification. My invention, however, both as to organization and method of operation together with further objects and advantages thereof, may best be understood by reference to the following description taken in conjunction with the accompanying drawing.

In the drawing, Figure 1 is a side elevational view showing a conduit incorporating a flow control device embodying my invention, the view being in section to show details of the device;

Figure 1:
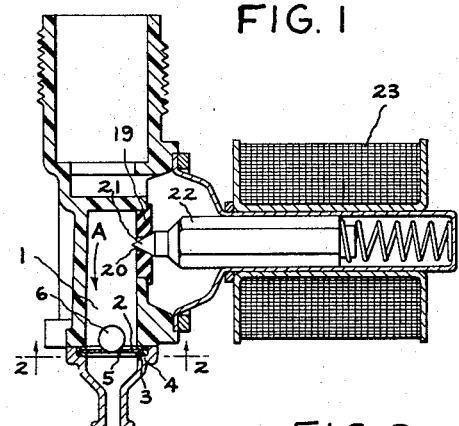
Figure 3:
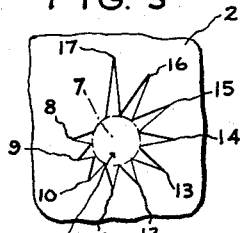
Figure 3 is an enlarged view of the aperture shown in Figure 2.
Figure 2:
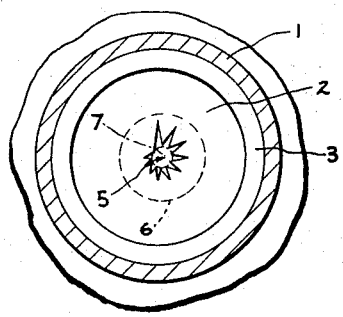
Figure 2 is a view taken along line 2—2 in Figure 1.

Referring now to Figures 1, 2 and 3 of the drawing, I have shown therein a flow control device which incorporates a conduit 1 wherein the direction of flow, or flow axis, is as indicated by the arrow A. Within the conduit I provide a plate or wall member 2 which may, as shown, be mounted within a resilient annular member 3 secured by any desired means against the shoulder 4 of conduit 1. Wall 2 is provided with a single aperture 5 which is formed in a plane generally normal to the flow axis of the conduit. Positioned in the conduit upstream of the wall 2 is a sphere or ball member 6 whose diameter is such as to preclude its passage through opening 5 as a result of flow in conduit 1. Ball 6 is formed of a suitable resilient compressible material; one such suitable material has, for instance, been found to be rubber having a durometer reading of 40.

The shape of opening 5 is of prime importance in obtaining suitable flow control characteristics from the construction shown. Referring particularly to Figure 3, it will be seen that the opening 5 consists essentially of a circular center section 7 with a series of generally triangular sections 8 through 17 formed about and abutting the circular section 7. Triangular sections 8 through 17 are of differing dimensions from each other, as shown. This difference in dimensions preferably takes the form of radial differences (relative to circle 7) in the height of the triangles.

With the construction shown, that is, with the ball 6 abutting aperture 5, upon initiation of flow through the conduit 1 the ball will, as the pressure increases, be flattened down against the aperture. As the ball becomes more flattened it tends to close off an increasing area of the aperture, and increasing amounts of the triangular sections 8 through 17. As the pressure continues to increase the ball will close off first aperture 8 which extends the smallest radial distance from the center of the aperture; then, as the pressure increases still further, triangular section 9 will be closed off; then section 10, etc. In other words, the higher the pressure the flatter the ball and the greater the total area of the aperture 5 which is closed off as a result of the individual triangular sections becoming closed off. This combination of decreasing aperture area, as the variously shaped triangular sections about central section 7 are closed off, combined with the increasing pressure behind the flow, controls the output flow through the conduit.

The system includes, of course, suitable means for controlling flow into conduit 1. This may take the form, for instance, of a member 19 secured in conduit 1 and provided with an opening 20. The end 21 of the movable core 22 of a solenoid assembly 23 is formed as a valve member which, when seated in opening 20, prevents flow into conduit 1. When the solenoid is energized, core 22 is moved away from opening 20 to permit liquid flow into the conduit. Member 19, in addition to its valve function, also acts as a closure member or retainer to maintain sphere 6 in a position where it is operative to perform as described upon flow through conduit 1.

Figure 4:
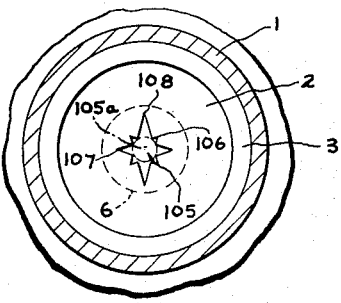
Figure 4 is a view, similar to the view of Figure 2, of a modification of my invention.
Figure 5:
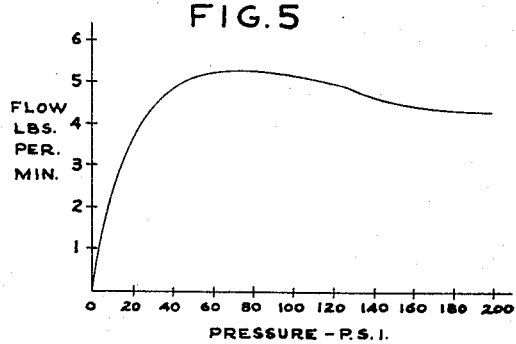
Figure 5 is a graph illustrating the effectiveness of the construction of Figure 4.

Referring to Figures 4 and 5, there is shown a second embodiment of the invention and the results obtained therefrom. In this case, the aperture 105 has the general shape of a star. It can be seen that when the star is dissected into its various components, it is basically a circular center section 105a surrounded by triangular sections which are of different dimensions with respect to each other. In the case of this construction, there are three different types of triangular shapes provided as shown by numerals 106, 107, and 108. As the pressure rises, ball 6 flattens out against aperture 105 and progressively closes off more and more of the aperture until, first, triangular sections 106 are shut off and then triangular sections 107, so that finally only the ends of triangular sections 108 are free to pass liquid. The effectiveness of this particular combination of differently dimensioned triangular sections positioned around a central circular section is shown in the flow curve of Figure 5 where it can be seen that, from a pressure of approximately 20 pounds per square inch up above a pressure of 200 pounds per square inch, the flow is kept between 4 and 5½ pounds of water per minute, i.e., approximately one half gallow flow per minute. It is to be noted that almost all municipal water systems maintain a pressure at their domestic outlets which falls somewhere within the 20 to 200 pounds range per square inch, so that the flow control device of Figure 4 is highly effective within the practical range in which its primary use will be found.

Figure 6:
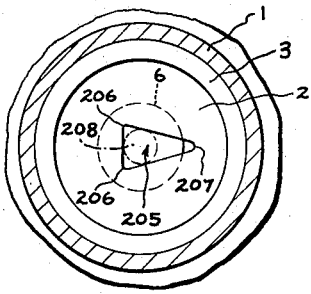
Figure 6 is a view, similar to the view of Figure 2, showing a second modification of my improved flow control device.
Figure 7:
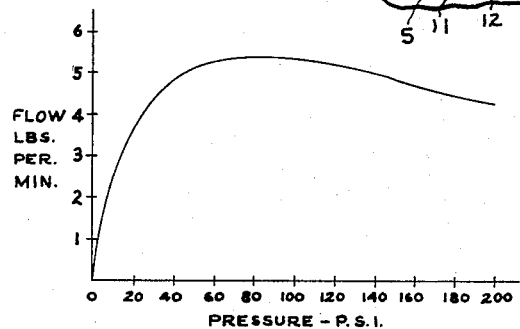
Figure 7 is a graph illustrating the improved flow control characteristics of the construction of Figure 6.

Referring now to Figures 6 and 7, there is shown yet a third embodiment of the invention, and the results obtained during testing of this construction. In the arrangement of Figure 6 the aperture 205 is formed as a non-equilateral triangle. More specifically, in this arrangement the triangle is an isosceles triangle formed by providing two like triangles 206 and triangle 207 about the basic circular center 208. The base angles formed by sections 206 are relatively large, while the apex angle formed by section 207 is smaller. As before, when the pressure rises the ball will flatten and will cover more and more of the aperture 205 until eventually triangular sections 206 are completely shut off, at which point only the relatively long triangular section 207 remains, decreasing in area as the pressure increases. The results of this construction are shown in Figure 7, and it will be seen that this isosceles triangle arrangement provides substantially the same flow characteristics as the construction of Figure 4, maintaining the flow in the four to five and one half pounds per minute (one-half gallon per minute) range throughout the pressure range from 20 to 200 pounds per square inch.

The new and improved flow control device is very inexpensive to manufacture and assemble, the plate and the resilient ball both being inexpensive and readily obtainable. Further, a highly accurate flow control effect is provided in the flow-rate range.

It will, of course, be understood, that the triangular configuration of the sections referred to above is not necessarily limited to triangles having completely straight sides. In fact, the base of each triangle must necessarily be curved where it abuts the basic circular center section, and some curvature may readily be introduced into the sides of the triangles; it is the converging nature of the sides of each section, and the unequal converging characteristics of the different sections which is of prime importance.

While in accordance with the patent statutes I have described what at present are considered to be the preferred embodiments of my invention, it will be obvious to those skilled in the art that various changes and modifications may be made therein without departing from the invention, and it is therefore aimed in the appended claims to cover all such changes and modifications as fall within the true spirit and scope of the invention.

What I claim as new and desire to secure by Letters Patent of the United States is:

1. A flow control device for maintaining a relatively constant rate of fluid flow comprising a passageway through which the flow to be controlled is passed, a wall closing the outlet of said passageway, said wall having a single aperture therethrough formed in a plane substantially normal to the flow axis of said passageway, said aperture being formed as a series of at least two triangular sections of different dimensions abutting about a generally circular center section, and a single sphere formed of resilient compressible material unattachedly enclosed in said passageway on the upstream side of said wall, said sphere moving against said aperture upon flow through said passageway and thereby being effective to block off said triangular sections progressively one after the other as it is deformed against said wall by increasing pressure thereby to maintain a relatively constant flow through said device.

2. The device defined in claim 1 wherein said triangular sections are of different radial lengths with respect to said generally circular center section.

3. The device defined in claim 1 wherein said triangular sections provide a generally star shaped configuration wherein said triangular sections form the points of said star, said star having at least two substantially different point configurations providing different radial lengths relative to said generally circular center section.

4. The device defined in claim 1 wherein said triangular sections and said generally circular center section form a non-equilateral triangle.

5. The device defined in Figure 1 wherein a total of three triangular sections are provided in combination with said generally circular center section and form therewith an isosceles triangle having relatively large base angles and a smaller apex angle.

References Cited in the file of this patent

UNITED STATES PATENTS

| | | |
|---|---|---|
| 2,106,638 | Hillier | Jan. 25, 1938 |
| 2,545,000 | Martin | Mar. 13, 1951 |
| 2,607,369 | Miller | Aug. 19, 1952 |
| 2,777,464 | Mosely | Jan. 15, 1957 |